Aug. 18, 1936.  E. R. REYNOLDS  2,051,345
TAG HOLDER FOR STORAGE BATTERIES
Filed Oct. 29, 1935
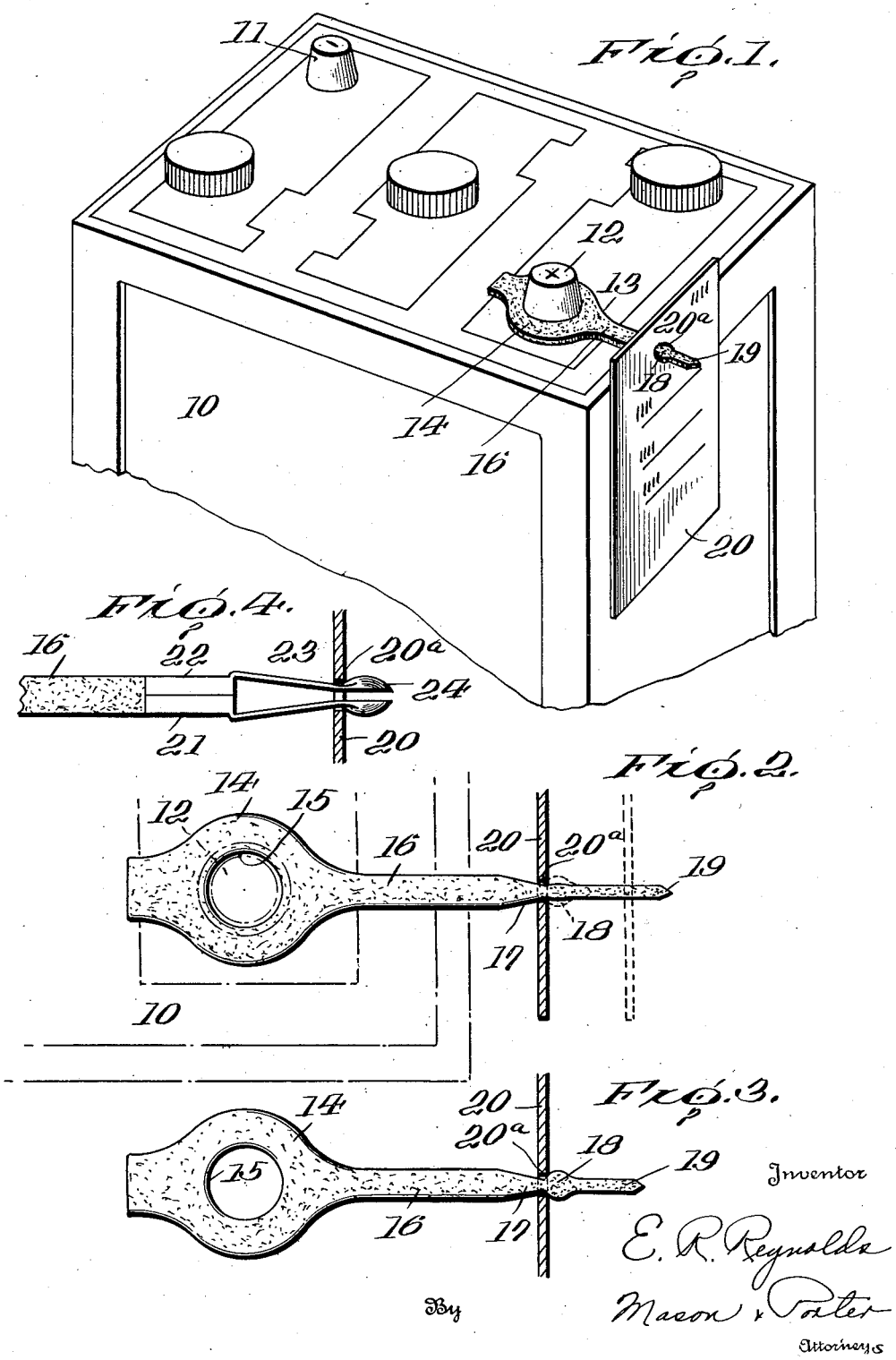
Inventor
E. R. Reynolds
By Mason & Porter
Attorneys Patented Aug. 18, 1936

2,051,345

UNITED STATES PATENT OFFICE 2,051,345

TAG HOLDER FOR STORAGE BATTERIES

Eddy Robert Reynolds, Fredonia, N. Y.

Application October 29, 1935, Serial No. 47,323

5 Claims. (Cl. 40—10)

The present invention relates to new and useful improvements in tag holders and more particularly to a device for attaching tags to storage batteries and the like for identification purposes during charging, storing and repairing.

An object of the present invention is to provide a device of the above type which may be frictionally attached to a standard part of the battery in a manner which permits the tag to be held thereon so that it will not become soaked or damaged with acid.

A further object of the invention is to provide a device of the above type which may be attached to one of the terminals of the battery and which will not become damaged by contact with acid and which extends laterally beyond the side of the battery so that an identification tag may be attached to the end thereof and disposed outside of the battery casing.

These and other objects of the invention will in part be obvious and will be hereinafter more fully disclosed.

In the drawing:

Fig. 1 is a perspective view showing a storage battery with the tag and tag holder attached thereto.

Fig. 2 is a detail top view showing the manner in which the tag is attached to the holder.

Fig. 3 is a similar view showing the tag holder with the tag applied thereto.

Fig. 4 is a fragmentary side elevation showing a modified form of tag holder.

Heretofore batteries were usually provided with some sort of a handle device or finger holes by which they could be picked up. At that time, it was customary to wire the necessary identification tags to the handle or finger holes when they were on the charging line or in the possession of a service station for repairs or storage. It was found that tags attached to a battery in this manner were liable to become lost because of the fact that the acid corroded the wires to such an extent that the tag became unfastened from the battery. It was also found that tags attached to batteries in this way became soaked with acid so that the identification marks thereon were obliterated. At the present time, most storage batteries are of the ledge type which merely have an offset portion by which they may be picked up. This necessitates the tying of the tag by wire around one of the terminal posts but, as stated above, such an arrangement is not practical and, furthermore, the terminal posts are usually tapered so that the wire easily slips off.

The present invention relates to a tag holder which obviates the foregoing and other disadvantages. It consists of an acid resisting body portion which is preferably formed of relatively stiff rubber. The body portion has an enlarged apertured portion at one end thereof. It is adapted to be placed flat against the top of the battery with one of the terminal posts extending through the opening in the enlarged portion. The opposite or free end of the body portion extends beyond one of the vertical faces or sides of the battery casing and is formed in a manner which affords retaining means for holding a tag thereon outside of the casing.

Referring more in detail to Figs. 1, 2 and 3 of the accompanying drawing, there is shown a battery 10 having terminal posts 11, 12. The tag holder 13, which is formed of rubber or other suitable acid resisting composition, is provided with an enlarged portion 14 through which is an opening 15. As shown in Fig. 1, the terminal post 12 extends through the opening 15 and the holder 13 is held thereon by frictional contact between the post and the material surrounding the opening 15. The shank portion 16 of the holder 13 extends horizontally away from the post 12 and lies flat against the top of the battery. The shank portion extends beyond the side of the battery casing, and at a point outside of the casing, is tapered outwardly as at 17. The tapered portion 17 merges into a slightly enlarged portion 18 in the form of a node from which there extends a handle portion 19.

In order to place the tag 20 on the tag holder 13, the handle portion 19 is grasped and pulled outwardly to the position shown in full lines in Fig. 2. This outward stretching of the shank 16 reduces the size of the node 18, as shown in Fig. 2, so that it will extend through the opening 20a in the tag 20. The tag 20 is then moved along the shank to a point adjacent the tapered portion 17. Upon releasing the handle portions 19 and thus allowing the shank portion 16 to resume its original shape, the node 18 will become enlarged and form a stop for preventing the opening 20a in the tag 20 to be moved thereover. This attached position of the tag is shown in Fig. 3.

The composition of the tag holder 13 is of sufficient stiffness to hold the tag properly outside of the battery without sagging, but at the same time is of sufficient inherent elasticity to permit the handle portion 19 to be stretched in the manner pointed out above so that the tag may be affixed thereto.

In Fig. 4 a modified form of the device is shown. In this modified form, an end member 20 is provided with a collar portion 21 which is secured to the end of the shank portion 16 outside of the battery casing. This end member 21 is also provided with a pair of outwardly extending arms 23 which are provided with enlarged cooperating ends 24. The inherent resilience in the arms 23 tends to hold the ends 24 thereof in spaced relation. When, however, it is desired to affix the tag to the holder, the arms 23 may be pressed together, thus bringing the ends 24 thereof together so that the opening 20a and the tag 20 may pass thereover. Upon releasing the arms 23, the ends 24 thereof will spring apart, thus preventing the removal of the tag therefrom.

It is obvious that minor changes in the details of construction and the arrangement of parts may be made without departing from the scope of the invention as set forth in the appended claims.

I claim:

1. A holder for an apertured tag for identifying a storage battery during charging, storing or repairing, comprising a shank portion adapted to have one end thereof attached to the battery and having adjacent the opposite end thereof means reducible in peripheral dimensions for permitting the aperture in the tag to pass thereover, said means being expansible to afford a stop for preventing the removal of the tag therefrom.

2. A holder for an apertured tag for identifying a storage battery during charging, storing or repairing, comprising a shank portion having resilient means at one end thereof for attaching the same to a battery terminal and having adjacent the opposite end thereof means reducible in peripheral dimensions for permitting the aperture in the tag to pass thereover, said means being expansible to afford a stop for preventing the removal of the tag therefrom.

3. A holder for an apertured tag for identifying a storage battery during charging, storing or repairing, comprising a resilient shank portion having a relatively large apertured portion at one end thereof adapted to be frictionally attached to one of the battery terminals, and having a node adjacent the opposite end of said shank portion for preventing the removal of the tag therefrom, said node being reducible in size by the stretching of the end of said shank portion to permit the tag to be affixed thereto or removed therefrom.

4. A holder for an apertured tag for identifying a storage battery during charging, storing or repairing, comprising a shank portion having a resilient apertured portion at one end thereof adapted to frictionally engage one of the battery terminals, and having at the opposite end thereof a pair of resilient arms having enlarged ends normally spaced apart, said arms being compressible to bring together the said enlarged ends to permit the aperture in the tag to pass thereover, and said arms adapted to spring apart to afford a stop for preventing the removal of the tag therefrom.

5. In combination with a storage battery having a terminal post, a holder for an apertured tag for identifying the battery during charging, storing or repairing, said holder including a shank portion having at one end thereof a resilient apertured portion adapted to frictionally engage the battery terminal, the opposite end of said shank portion extending beyond one of the vertical sides of the battery and having adjacent the said end means reducible in peripheral dimensions for permitting the aperture in the tag to pass thereover, said means being expansible to afford a stop for preventing removal of the tag therefrom.

EDDY ROBERT REYNOLDS.